United States Patent [19]

Lew

[11] Patent Number: 5,036,712
[45] Date of Patent: Aug. 6, 1991

[54] INERTIA FORCE FLOWMETER

[76] Inventor: Hyok S. Lew, 7890 Oak St., Arvada, Colo. 80005

[21] Appl. No.: 492,919

[22] Filed: Mar. 13, 1990

Related U.S. Application Data

[63] Continuation-in-part of Ser. No. 477,488, Feb. 9, 1990.

[51] Int. Cl.$^5$ ............................ G01F 1/28; G01F 1/80
[52] U.S. Cl. .................................................. 73/861.72
[58] Field of Search ........... 73/861.35, 861.69, 861.71, 73/861.72

[56] References Cited

U.S. PATENT DOCUMENTS 2,538,785  1/1951  Karig .......................... 73/861.71 X
3,167,691  1/1965  Halista ........................ 73/861.72 X

*Primary Examiner*—Herbert Goldstein

[57] ABSTRACT

An apparatus for measuring flow rate of media comprises at least one protruding section of a conduit disposed in an over-hanging arrangement, a force sensor measuring the force experienced by an over-hanging portion of the protruding section of the conduit, and a pressure gauge measuring pressure of the media moving through the conduit; wherein inertia force of the media as a measure of flow rate of the media is determined from inertia force portion of the force measured by the force sensor that is obtained by subtracting pressure portion of the force determined from the pressure measured by the pressure gauge from total value of the force measured by the force sensor.

4 Claims, 3 Drawing Sheets

INERTIA FORCE FLOWMETER

BACKGROUND OF THE INVENTION

This is a continuation-in-part application to a patent application Ser. No. 07/477,488 entitled "Inertia Force Flowmeter" filed on Feb. 9, 1990. One of the most popular methods for measuring mass flow rate through a conduit is to induce a flexural vibration of the conduit and measure the deviation in the mode of flexural vibration of the conduit containing moving media from that of the conduit containing stationary media as a measure of mass flow rate, which principles have been employed in the construction and operation of a family of flowmeters commonly known by the name of Coriolis Force or Convective Inertia Force flowmeters. As the magnitude of deviation in the mode of flexural vibrations of the conduit resulting from the moving mass in the conduit is usually very small, the Coriolis Force or Convective Inertia Force flowmeter is not capable of measuring the mass flow rates of liquid media moving at low velocities as well as that of gaseous media moving at moderately high velocities. Since the vibrating conduit or conduits employed in the Coriolis Force or Convective Inertia Force flowmeters are constantly and continuously vibrated, the vibrating conduit or conduits are vunerable to failure due to fatigue of the conduit material. The Coriolis Force or Convective Inertia Force flowmeter cannot have a large diameter flow passage, as it is totally impractical to induce and maintain a flexural vibration of conduits of diameter greater than two inches. The present invention teaches construction and operation of a mass flowmeter comprising one or more conduits which are not vibrated, and have diameters as small as a fraction of an inch or as large as several inches.

BRIEF SUMMARY OF THE INVENTION

The primary object of the present invention is to provide a mass flowmeter comprising a protruding section of a conduit providing a flow passage for media, that experiences a stress or strain caused by the pressure and inertia force of the media moving therethrough, wherein the mass flow rate of the media is determined from the portion of the stress or strain experienced by the protruding section of the conduit, which portion is created exclusively by the inertia force of the moving media.

Another object is to provide a mass flowmeter comprising a protruding section of a conduit disposed on a plane wherein the stress or strain caused by the pressure and inertia force of the media is perpendicular to the stress or strain caused by the weight of the media, which combination includes a means for measuring stress or strain caused by the pressure and inertia force of the media and means for measuring pressure of the media, wherein the portion of the stress or strain caused by the inertia force is obtained from the total value of the stress or strain measured by the stress or strain measuring means minus the stress or strain caused by the media pressure determined by an emprical relationship as a function of the pressure measured by the pressure measuring means.

A further object is to provide a mass flowmeter comprising a pair of protruding conduits providing two parallel flow passages, wherein the portion of the stress or strain caused by the inertia force of the media is determined from a combination of the two total values of the stress or strain respectively experienced by the two protruding conduits.

Yet another object is to provide a mass flowmeter comprising a pair of protruding conduits wherein the first conduit provides a flow passage and the second conduit is blocked, while both protruding conduits are subjected to generally equal media pressure; wherein the portion of the stress or strain caused by the inertia force of the media is determined from a combination of two total values of the stress or strain respectively experienced by the two protruding conduits.

Yet a further object is to provide a mass flowmeter comprising a pair of protruding sections of a conduit providing a single continuous flow passage, wherein the portion of the stress or strain caused by the inertia force of the media is determined from a combination of the two total values of the stress or strain respectively experienced by the two protruding sections of the conduit.

Still another object is to provide a mass flowmeter comprising a first and second protruding conduits providing two parallel and equal flow passages and a third protruding conduit providing a single flow passage commonly connected to the first and second protruding conduits, wherein the portion of the stress or stain caused by the inertia force of the media is determined from a combination of the two total values of the stress or strain respectively experienced by the first and third protruding conduits.

Still a further object is to provide a mass flowmeter comprising a first and second sections of a conduit respectively connected to an inlet and outlet legs of the conduit, and a curved midsection of the conduit connecting the first and second sections of the conduit in an arrangement allowing a relative deflection therebetween, wherein the stress caused by the inertia force of the media moving through the conduit that tends to generate a relative deflection between the first and second sections of the conduit is measured as a measure of the mass flow rate times the volume flow rate of the media.

Yet still another object is to provide a mass flowmeter comprising a first and second sections of a conduit connected to one another by a curved midsection of the conduit, wherein the inertia force of the media moving through the conduit is determined from a combination of a force causing separation between the first and second sections of the conduit and differential pressure of the media across the two extremities of the curved section of the conduit respectively connected to the first and second sections of the conduit.

Yet still a further object is to provide a mass flowmeter comprising a first and second sections of a conduit connected to one another by a flexible midsection of the conduit, wherein the inertia force of the media moving through the conduit is determined from a combination of a force causing separation between the first and second sections of the conduit and differential pressure across the two extremities of the flexible midsection of the conduit respectively connected to the first and second sections of the conduit.

These and other objects of the present invention will become clear as the description thereof progresses.

BRIEF DESCRIPTION OF THE FIGURES

The present invention may be described with a greater clarity and specificity by referring to the following figures.

DESCRIPTION OF THE ILLUSTRATED EMBODIMENTS

Figure 1:
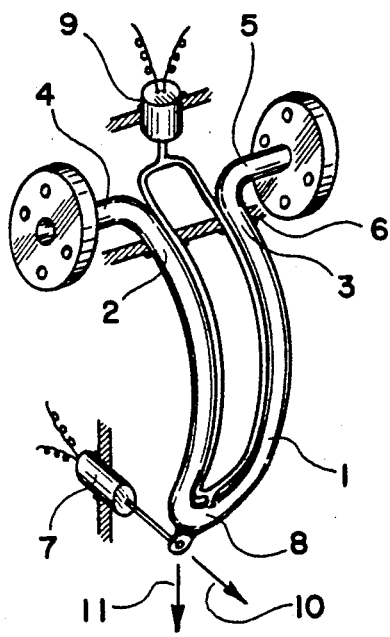
FIG. 1 illustrates an embodiment of the inertia force flowmeter of the present invention comprising a single protruding conduit.

In FIG. 1, there is illustrated an embodiment of the inertia force flowmeter constructed in accordance with tho principles of the present invention. A protruding section of conduit 1 with the two extremities 2 and 3 respectively connected to the two port legs 4 and 5, and anchored to a support structure 6 is disposed on a curved plane parallel to the two port legs 4 and 5 in an overhanging arrangement. A stress or strain gauge 7 measures the force or displacement experienced by the over-hanging extremity 8 of the protruding conduit 1 in a direction lateral to the curved plane that includes the protruding conduit 1, while a pressure gauge 9 measures the pressure of the media moving through the flow passage provided by the protruding conduit 1 at the over-hanging extremity 8. The pressure of media and the inertia force such as the centrifugal force of media moving through the curved protruding conduit 1 exerts a loading on the protruding conduit 1, that causes a bending deflection of the protruding conduit 1 resulting in the reduction of curvature thereof measured along a plane of the symmetry of the protruding conduit 1 perpendicular to the curved plane including the protruding conduit 1. The weight of the media contained in the conduit also causes a bending deflection of the protruding conduit. In the embodiment shown in FIG. 2 the weight of media contained in the first protruding conduit 12 imposes a bending stress or strain in a direction opposite to that imposed by the pressure and inertia force of the media contained therein, while the weight of media contained in the second protruding conduit 13 imposes a bending stress or strain in the same direction as that imposed by the pressure and the inertia force of the media. In other words, the two protruding conduits 12 and 13 respectively experience two opposite bending stresses or strains imposed by the weight of media contained therein. Therefore it is evident that there exists a curved plane intermediate the two curved planes respectively the two protruding conduits 12 and 13, which curved plane including the protruding conduit 1 shown in FIG. 1 results in a net bending stress or strain 11 on the protruding conduit 1, that is equal to zero or perpendicular to the bending stress or strain 10 imposed by the pressure and the inertia force of media contained in the protruding conduit 1; wherein the force or displacement measuring device 7 measures the force or displacement F created by the pressure and the inertia force of media and experienced by the protruding conduit, that is given by the following equation:

$$F = C_1 pA + C_2 \rho U^2 A, \tag{1}$$

where $C_1$ and $C_2$ are coefficients of proportionality, p is the pressure, $\rho$ is the density, U is the velocity of the media, and A is the cross section area of the flow passage provided by the protruding conduit 1. Equation (1) may be written in a more general form as follows:

$$F = f_1(p) + f_2(\rho U^2), \tag{2}$$

where $f_1$ and $f_2$ stand for empirically determined mathematical relationships relating the force or displacement to the pressure and the inertia force. The inertia force is determined by equation (2) as a function of the force or displacement F measured by the force or displacement measuring device 7 and the pressure p measured by the pressure measuring device 9

$$\rho U^2 = f_2^{-1}[F - f_1(p)]; \tag{3}$$

where $f_2^{-1}$ stands for inverse relationship of the mathematical relationship $f_2$. When the media velocity U or density $\rho$ is measured by a volume flowmeter or density meter, the mass flow rate $\rho UA$ is determined from a combination of the measured value of U or $\rho$ and the inertia force determined by equation (3).

Figure 2:
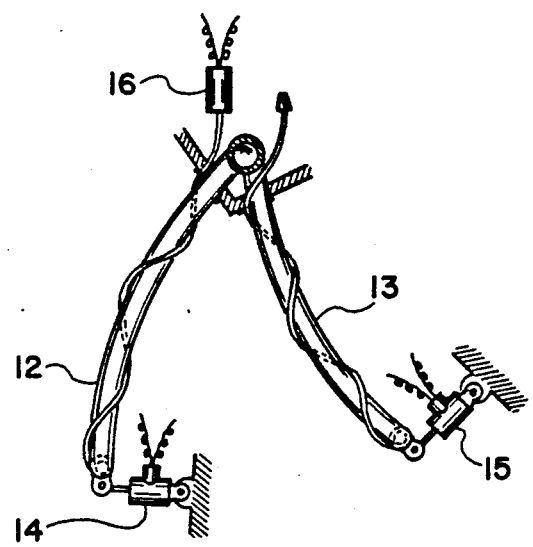
FIG. 2 illustrates an embodiment of the inertia force flowmeter comprising a pair of protruding conduits providing two flow passages.

In FIG. 2 there is illustrated an embodiment of the inertia force flowmeter comprising a pair of identical protruding conduits 12 and 13 commonly connected to the inlet and outlet legs, each of which has the same construction as the protruding conduit 1 shown in FIG. 1. The force or displacement measuring derices 14 and 15 measure the total forces or displacements $F_1$ and $F_2$ experienced by the over-hanging extremities of the protruding conduits 12 and 13, which can be expressed in the form $$F_1 = f_1(p) + f_2(\rho U^2/4) - K_1\rho, \text{ and} \quad (4)$$

$$F_2 = f_1(p) + f_2(\rho U^2/4) + K_2\rho, \quad (5)$$

where $K_1$ and $K_2$ are empirically determined coefficients of proportionality, should be the same for the perfectly matched pair of the protruding conduits. Equations (4) and (5) are simultaneously solved to obtain the following equation for the inertia force:

$$\rho U^2 = 4 f_2^{-1} \left[ \frac{K_2 F_1 + K_1 F_2}{K_1 + K_2} - f_1(p) \right]. \quad (6)$$

Figure 3:
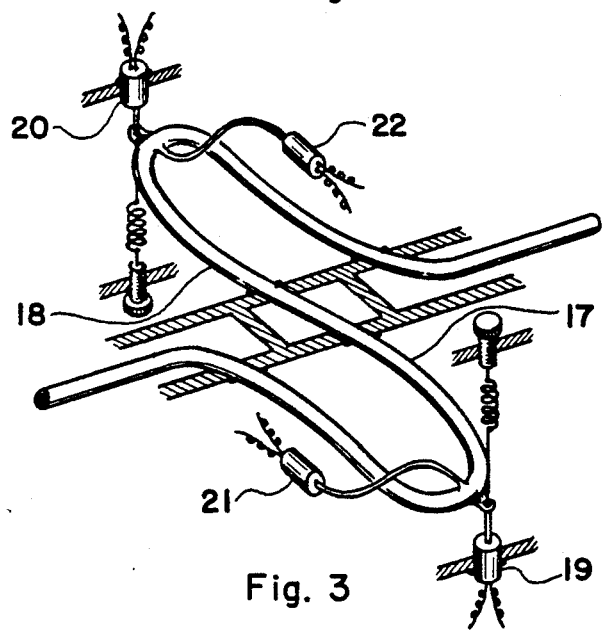
FIG. 3 illustrates an embodiment of the inertia force flowmeter comprising a pair of protruding conduits providing a single continuous flow passage.

It must be understood that the two protruding conduits 12 and 13 may be disposed in an axisymmetric arrangement about an axis coinciding with the central axis of the inlet and outlet legs as exemplified by the embodiment shown in FIG. 3.

In FIG. 3 there is illustrated an embodiment of the inertia force flowmeter comprising a pair of identical protruding conduits 17 and 18 providing a single continuous flow passage The force or displacement measuring devices 19 and 20 measure the forces or displacements $F_1$ and $F_2$ experienced by the overhanging extremities of the two protruding conduits 17 and 18, while the pressure measuring devices 21 and 22 measures media pressure $p_1$ and $p_2$ thereat. It can be readily shown that the inertia force is related to the forces or displacements $F_1$ and $F_2$ respectively measured by the devices 19 and 20, and the pressures $p_1$ and $p_2$ respectively measured by the devices 21 and 22 by the following equation:

$$\rho U^2 = f_2^{-1} \left\{ \frac{1}{K_1 + K_2} [K_2 F_1 + K_1 F_2 - K_2 f_1(p_1) - K_2 f_1(p_2)] \right\}, \quad (7)$$

where the empirically determined coefficients of proportionality $K_1$ and $K_2$ have the same numerical value for the perfectly matched pair of protruding conduits. It should be mentioned that the two protruding conduits 17 and 18 appearing in FIG. 3 or 12 and 13 appearing in FIG. 2 may not be identical pairs, wherein equations (6) and (7) take a slightly more complicated form and yet are easily manageable in computation. It should be understood that the two protruding conduits 23 and 24 may be disposed in an axisymmetric arrangement as exemplified by the embodiment shown in FIG. 3 instead of the plane-symmetric arrangement shown in FIG. 4.

Figure 4:
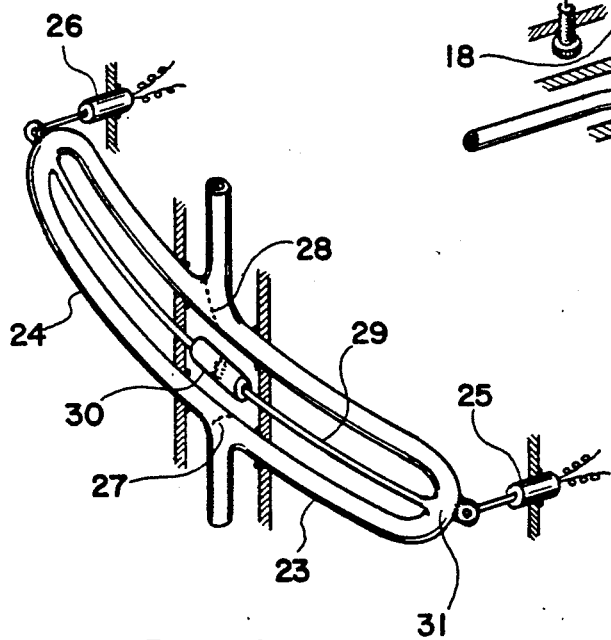
FIG. 4 illustrates a embodiment of the inertia force flowmeter comprising a first protruding conduit providing a flow passage and a second protruding conduit with a blockage.

In FIG. 4 there is illustrated an embodiment of the inertia force flowmeter comprising a pair of identical protruding conduits 23 and 24 respectively disposed on two curved vertical planes, wherein the bending stress or strain imposed by the pressure and the inertia force is in the horizontal direction, while that imposed by the weight of media is in the vertical direction. The force or displacement measuring devices 25 and 26 measure the forces or displacements $F_1$ and $F_2$ in the horizontal direction imposed exclusively by the pressure and inertia force of media and experienced by the over-hanging extremities of the two protruding conduits 23 and 24. The first protruding conduit 23 provides a flow passage, while the second protruding conduit 24 has two blockage 27 and 28, which blockage isolates the fluid in the second protruding conduit 24 from the media moving through the first protruding conduit 23. A pressure communicating tubing 29 with a flexible barrier 30 such as a bellows, diaphragm or piston equalizes the media pressure at the over-hanging extremity 31 of the first protruding conduit 23 to the fluid pressure contained in the second protruding conduit 24. It can be readily shown that the inertia force of the media moving through the first protruding conduit is given by the equation $$\rho U^2 = f_2^{-1}(F_1 - F_2). \quad (8)$$

The beauty of the embodiment shown in FIG. 4 is in the elimination of the pressure measuring device. It should be mentioned that the two protruding conduits 23 and 24 may not be identical to one another, in which case, the equation determining the inertia force of media becomes more complicated than equation (8) and yet is easily managed in computation.

Figure 5:
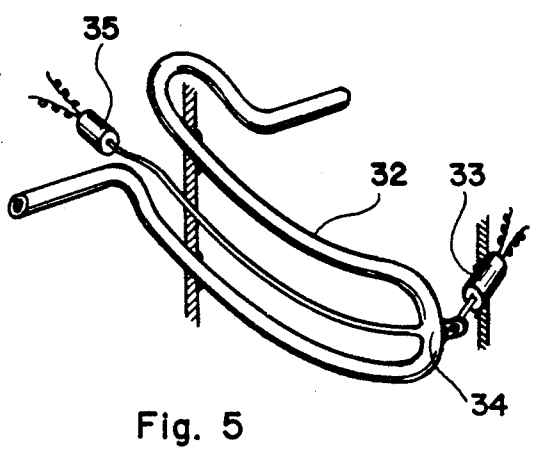
FIG. 5 illustrates an embodiment of the inertia force flowmeter comprising a protruding conduit disposed on a curved vertical plane.

In FIG. 5 there is illustrated an embodiment of the inertia force flowmeter comprising a protruding conduit 32 disposed on a curved vertical plane, that includes a force or displacement measuring device 33 measuring force or displacement F experienced by the over-hanging extremity 34 of the protruding conduit 32, and a pressure measuring device 35 measuring the pressure p of media moving through the conduit 32 at the over-hanging extremity thereof. The inertia force of media moving through the protruding conduit 32 is given by the equation $$\rho U^2 = f_2^{-1}[F - f_1(p)], \quad (9)$$

which is the same equation as that for the embodiment shown in FIG. 1.

Figure 6:
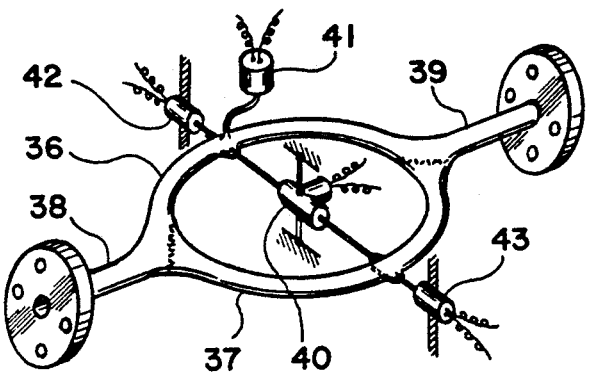
FIG. 6 illustrates an embodiment of the inertia force flowmeter comprising a pair of curved conduits providing two flow passages.

In FIG. 6 there is illustrated two different embodiments of the inertia force flowmeter comprising a pair of identical simply curved protruding conduits 36 and 37 commonly connected to the inlet and outlet legs 38 and 39, which protruding conduits are disposed on a horizontal plane. The first embodiment includes a force or displacement measuring device 40 measuring the force or displacement F tending to increase the distance between the midsections of the two protruding conduits 36 and 37 providing two parallel flow passages, and a pressure measuring device 41 measuring the pressure p of media at the midsection of one of the two protruding conduits 36 and 37. The inertia force of media moving through the two protruding conduits 36 and 37 is given by equation (9). The second embodiment includes a pair of force or displacement measuring devices 42 and 43 instead of the measuring devices 40 and 41, which measure the horizontal forces or displacements $F_1$ and $F_2$ experienced by the midsections of the two protruding conduits 36 and 37, wherein the first protruding conduit 36 provides a flow passage, while the second protruding conduit 37 is blocked in such a way that the media pressure in the first protruding conduit 36 is transmitted to the blocked second protruding conduit 37. The inertia force of media moving through the first protruding conduit is given by equation (8). It should be mentioned that the daily curved protruding conduit or conduits employed in the embodiments shown in FIGS. 1, 2, 3, 4 and 5 may be replaced by the simply curved protruding conduit or conduits employed in the embodiment shown in FIG. 6.

Figure 7:
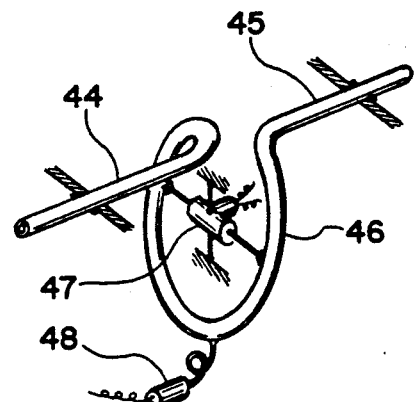
FIG. 7 illustrates an embodiment of the inertia force flowmeter comprising a looped section of conduit disposed on a plane perpendicular to the inlet and outlet legs of the conduit.

In FIG. 7 there is illustrated an embodiment of the inertia force flowmeter comprising two end sections 44 and 45 of a conduit connected to one another by a looped medsection 46 of the conduit, which looped midsection of the conduit is disposed generally on a plane perpendicular to the two sections 44 and 45 of the conduit. A force or displacement measuring device 47 measures a force or displacement F tending to increase the distance between the two opposite halves of the looped midsection 46 of the conduit, and a pressure measuring device 48 measures the pressure p of media at the midsection of the looped midsection 46 of the conduit. The inertia force of the media moving through the conduit is given by equation (9). It should be mentioned that the looped midsection 46 may be disposed on a plane generally parallel to the two sections 44 and 45 of the conduit as shown in FIG. 8.

Figure 8:
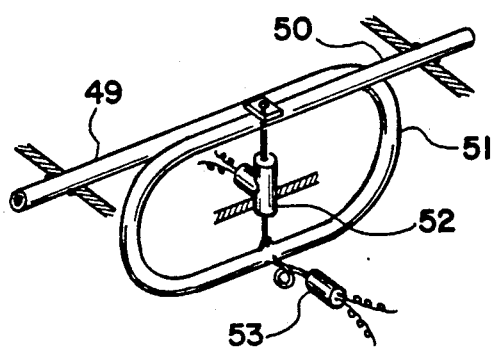
FIG. 8 illustrates an embodiment of the inertia force flowmeter comprising a looped section of conduit disposed on a plane parallel to the inlet and outlet legs of the conduit.

In FIG. 8 there is illustrated an embodiment of the inertia force flowmeter comprising two end sections 49 and 50 of a conduit connected to one another by a looped midsection 51 of the conduit which looped midsection of the conduit is disposed generally on a plane parallel to the two sections 49 and 50 of the conduit A force or displacement measuring device 52 measures the force or displacement F tending to increase the distance between the combination of the extremities of the two sections 49 and 50 of the conduit and the midsection of the looped midsection 51 of the conduit, and a pressure measuring device 53 measures the pressure p of media at the midsection of the looped midsection 51 of the conduit. The inertia force of the media is determined by equation (9). It should be mentioned that the looped midsection 51 may be disposed generally on a plane perpendicular to the two sections 49 and 50 of the conduit as shown in FIG. 7.

Figure 9:
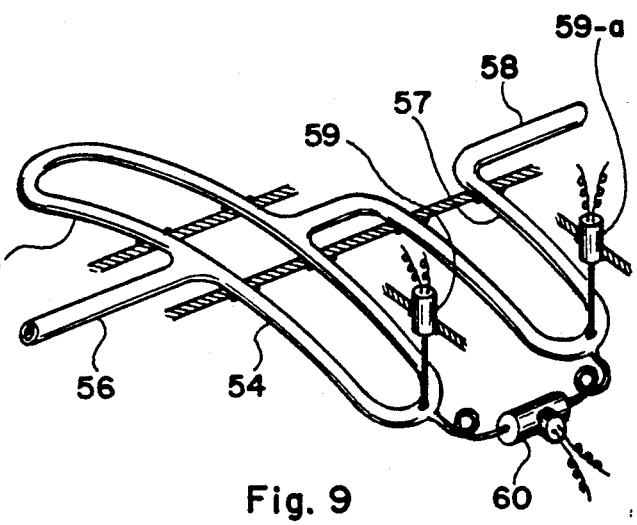
FIG. 9 illustrates an embodiment of the inertia force flowmeter comprising a first and second protruding conduits providing two flow passages and a third protruding conduit commonly connected to the first and second protruding conduits.

In FIG. 9 there is illustrated an embodiment of the inertia force flowmeter comprising a first and second protruding conduits 54 and 55 commonly connected to a first port leg 56 and a third protruding conduit 57 commonly connected to the first and second protruding conduits 54 and 55 at one extremity and extending to a second port leg 58 at the other extremity wherein all three protruding conduits have identical construction. Two force or displacement measuring devices 59 and 59a measure the forces or displacements $F_1$ and $F_2$ experienced by the over-hanging extremities of the protruding conduits 54 and 57, while a differential pressure gauge 60 measures the difference in the media pressure $\Delta p$ across the over-hanging extremities of the protruding conduits 54 and 57. It can be easily shown that the inertia force of the media is given by the equation $$\rho U^2 = \frac{4}{3} f_2^{-1} [(F_2 - F_1) + f(\Delta P)]. \tag{10}$$

When the media are fluid moving at a fully turbulent state, the pressure drop $\Delta p$ is proportional to the inertia force $\rho U^2$. Consequently, equation (10) may be written in the form $$\rho U^2 = f_3(F_2 - F_1), \tag{11}$$

where $f_3$ is an empirically determined mathematical relationship. Equation (11) suggests that the pressure measuring device 60 may be omitted from the embodiment shown in FIG. 9. It should be mentioned that the first and second protruding conduits 54 and 55 must be identical to one another to ensure the equi-division of the media flow therebetween, while the third protruding conduit 57 may or may not be identical to the first and second protruding conduits 54 and 55.

Figure 10:
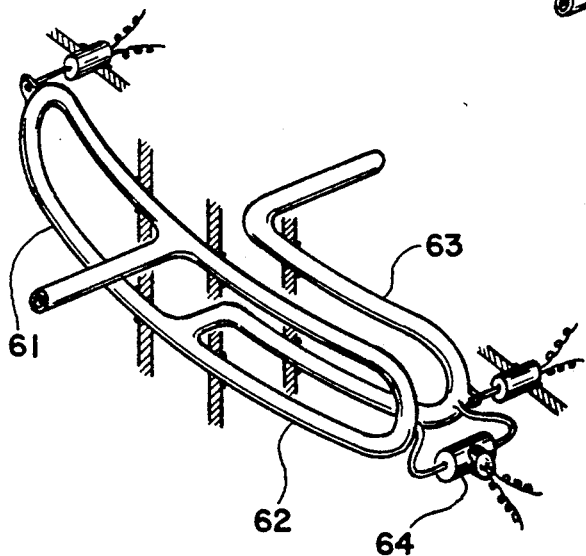
FIG. 10 illustrates another embodiment of the inertia force flowmeter operating on the same principles as that shown in FIG. 9.

In FIG. 10 there is illustrated another embodiment of the inertia force flowmeter having essentially the same construction and operating on the same principles as that of the embodiment shown in FIG. 9. In this particular embodiment, the protruding conduits 61, 62 and 63 are disposed on curved vertical planes. This embodiment operates per equation (10) with the differential pressure sensor 64, or per equation (11) without the differential pressure sensor 64.

Figure 11:
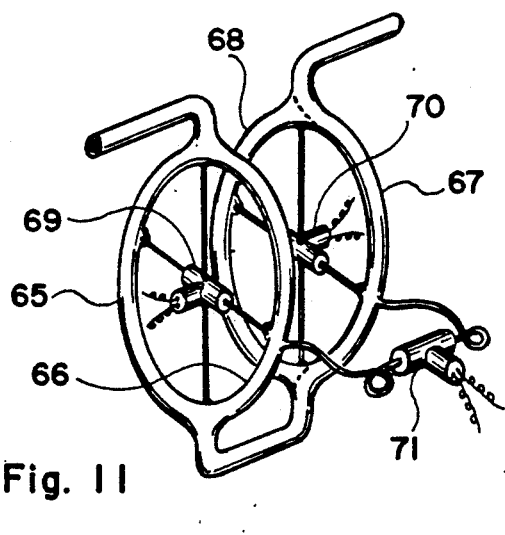
FIG. 11 illustrates a further embodiment of the inertia force flowmeter operating on the same principles as that shown in FIG. 9.

In FIG. 11 there is illustrated a further embodiment of the inertia force flowmeter having a construction similar to that shown in FIG. 10 and operating on the same principles as that described in conjunction with FIG. 9. The protruding conduits 61, 62 and 63 are now replaced with identical curved conduits 65, 66 and 67 disposed on generally flat vertical planes, while a dummy curved conduit 68 with a blockage is employed in order to exploit the advantage inherent in the uniform installations of the force or displacement measuring devices 69 and 70. This embodiment operates per equation (10) with the differential pressure gauge 71, or per equation (11) without the differential pressure gauge 71. It is readily recognized that the protruding conduits 54, 55 and 56 employed in the embodiment shown in FIG. 9 may be replaced by the simply curve conduits 65, 66 and 67 employed in the embodiment shown in FIG. 11.

It is not difficult to see that the embodiments shown in FIGS. 2, 3 and 9 have a built-in capability to measure the density of media. The embodiment shown in FIG. 2 determines the media density by the following equation resulting from a simultaneous solution of equations (4) and (5) for the media density $$\rho = \frac{F_2 - F_1}{K_1 + K_2}. \tag{12}$$

The embodiment shown in FIG. 3 determines the media density by the equation $$\rho = \frac{1}{K_1 + K_2} [F_2 - F_1 + f_1(p_1) - f_1(p_2)]. \tag{13}$$

The embodiment shown in FIG. 9 determines the media density by the following equation:

$$\rho = \tag{14}$$

$$\frac{1}{K_1 + K_2} [f_1(p_1) + f_1(p_2) + f_2(\rho U^2/4) + f_2(\rho U^2) - F_1 - F_2].$$

For matched protruding conduits, $K_1 = K_2$. Of course, according to equation (14), the differential pressure gauge 60 included in the embodiment shown in FIG. 9 has to be replaced by two total pressure gauges in order to provide it with the media density measuring capability. It is hereby concluded that the embodiments shown in FIGS. 2, 3 and 9 are self-sufficient flowmeters, which provide mass and volume flow rates as well as media density. It should be understood that the forces or displacements $F_1$ and $F_2$ appearing in equations (12), (13) and (14) excludes the portions of the forces or displacements created by the weight of the conduits themselves, which portions can be easily excluded from the measured values thereof as those portions are constants which do not depend on the state or flow variables of the media.

Figure 12:
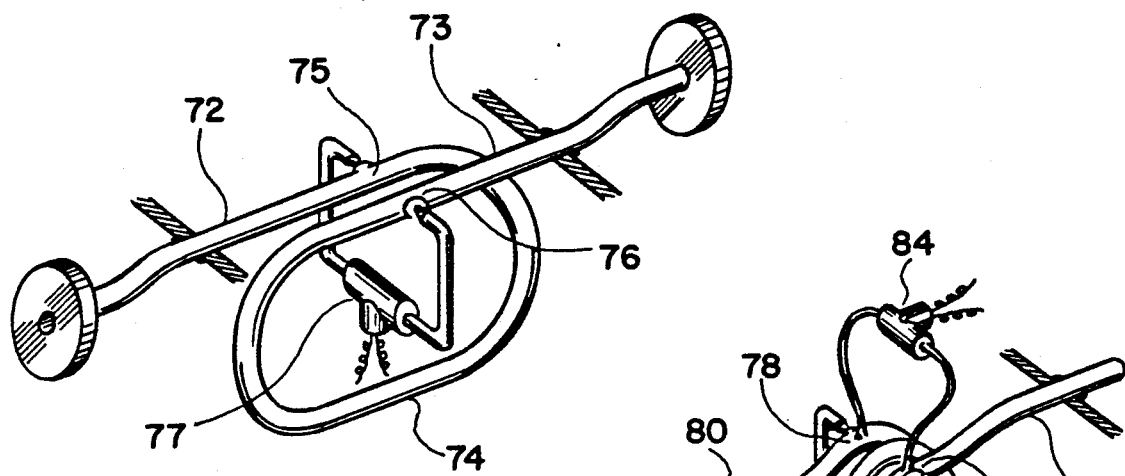
FIG. 12 illustrates an embodiment of the inertia force flowmeter comprising two end sections of conduit disposed in an off-set arrangement and connected to one another by a looped midsection of the conduit.

In FIG. 12 there is illustrated an embodiment of the inertia force flowmeter comprising two end sections 72 and 73 of a conduit connected to one another by a looped midsection of the conduit 74, which acts like a coil spring in providing a resilient connection between the extremities 75 and 76 of the two sections 72 and 73 of the conduit. The force or displacement measuring device 77 measures the force or displacement tending to increase the distance between the extremities 75 and 76 of the two sections 72 and 73 of the conduit, from which force or displacement the inertia force $\rho U^2$ of the media moving through the conduit is determined, as there exists a proportionality relationship therebetween.

Figure 13:
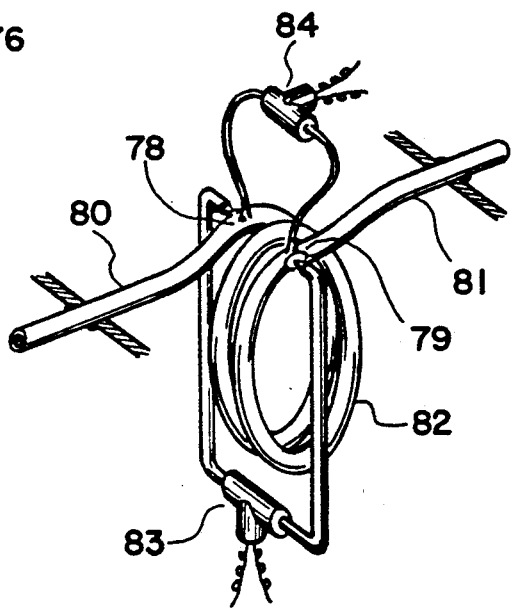
FIG. 13 illustrates another embodiment of the inertia force flowmeter having a construction similar to that shown in FIG. 12.

In FIG. 13 there is illustrated another embodiment of the inertia force flowmeter having a construction similar to that shown in FIG. 12. When the distance of separation between the extremities 78 and 79 of the two end section 80 and 81 of a conduit is sizable, the force or displacement therebetween cause by the pressure drop $\Delta p$ across the looped midsection 82 has to be taken into consideration. The force or displacement measuring device 83 measures the force or displacement F tending to increase the distance between the extremities 78 and 79 of the two sections 80 and 81 of the conduit, while the differential pressure measuring device 84 measures the differential pressure $\Delta p$ across the looped midsection 82 of the conduit. The inertia force of the media moving through the conduit is determined by the equation $$\rho U^2 = G_1 F - G_2 \Delta p, \qquad (15)$$

where $G_1$ and $G_2$ are empirically determined constants of proportionality. For fully turbulent flow, the differential pressure is proportional to the inertia force of media and, consequently, equation (15) can be written in the form $$\rho U^2 = G_3 F, \qquad (16)$$

where $G_3$ is another empirically determined coefficient of proportionality. When equation (16) is employed, there is no need of the differential pressure gauge 84, which justifies the operating principles of the inertia force flowmeter shown in FIG. 12.

Figure 14:
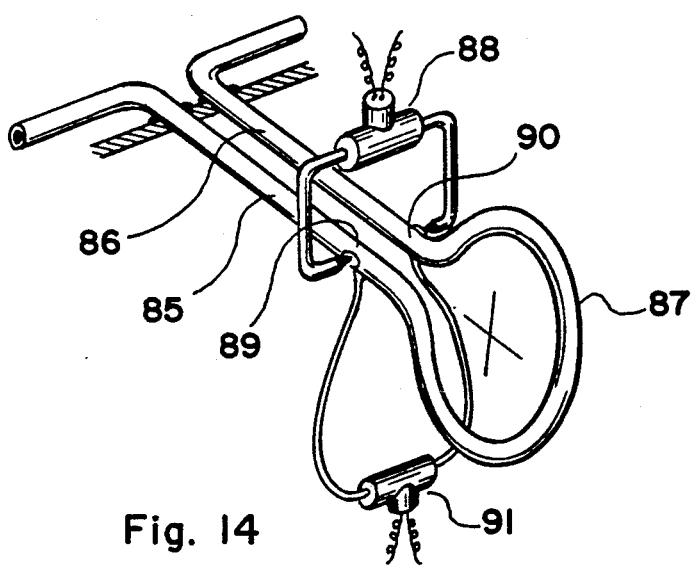
FIG. 14 illustrates an embodiment of the inertia force flowmeter comprising two end sections of conduit connected to one another by a looped midsection of the conduit disposed on a plane generally perpendicular to a plane including the two sections of the conduit.

In FIG. 14 there is illustrated a further embodiment of the inertia force flowmeter operating on the same principles as those described in conjunction with FIG. 13. Two end sections 85 and 86 of a conduit disposed in a side-by-side arrangement arc connected to one another by a looped midsection 87 of the conduit, which looped midsection is disposed generally on a plane perpendicular to a plane including the two sections 85 and 86 of the conduit. The force or displacement measuring device 88 measures the force or displacement tending to separate the extremities 89 and 90 of the two sections 85 and 86 of the conduit from one another, while the differential pressure measuring device 91 measures the differential pressure therebetween. The inertia force of media moving through the conduit is determined by equation (15) or (16). Of course, the differential pressure gauge 91 can be omitted when the inertia force is determined by equation (16).

Figure 15:
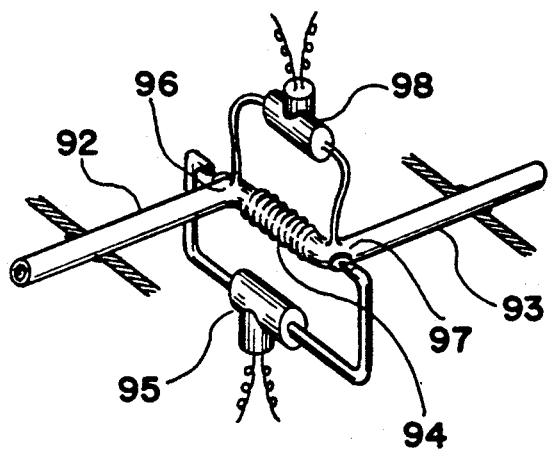
FIG. 15 illustrates an embodiment of the inertia force flowmeter comprising two end sections of the conduit disposed in an off-set arrangement and connected to one another by a flexible midsection of the conduit.

In FIG. 15 there is illustrated a further embodiment of inertia force flowmeter comprising two end sections 92 and 93 of a conduit disposed in an off-set and parallel relationship connected to one another by a flexible midsection 94 of the conduit such as a bellows coupling disposed in an angled arrangement with respect to the two sections 92 and 93 of the conduit. The force or displacement measuring device 95 measures the force or displacement tending to separate the extremities 96 and 97 of the two sections 92 and 93 of the conduit, while the differential pressure measuring device 98 measures differential pressure across the flexible midsection 94 of the conduit. The inert force of media moving through the conduit is determined by equation (15) with the differential pressure gauge 98, or by equation (16) without the differential pressure gauge 98.

While the principles of the present invention have now been made clear by the illustrative embodiments, there will be many modifications of the structures arrangements, proportions, elements and materials obvious to those skilled in the art, which are particularly adapted to specific working environments and operating condition in the practice of the inventions without departing from those principles. It is not desired to limit the inventions to the particular illustrative embodiments shown and described and, accordingly, all suitable modifications and equivalents may be regarded as falling within the scope of the invention as defined by the claims which follow.

The embodiments of the invention, in which an exclusive property or privilege is claimed, are defined as follows:

1. An apparatus for measuring flow of media comprising in combination:
   a) a first section of a conduit with one extremity anchored to a support and connected to an inlet leg of the conduit extending from said one extremity, and a second section of a conduit with one extremity anchored to a support and connected to an outlet of the conduit extending from said one extremity in an off-set arrangement with respect to said first section of the conduit;
   b) a resilient midsection of the conduit connecting the first section of the conduit to the second section of the conduit; and
   c) means for measuring force between the first and second sections of the conduit as a measure of flow rate of media moving through the conduit.

2. The combination as set forth in claim 1 wherein said combination includes a means for measuring differential pressure between the first and second sections of the conduit; wherein inertia force of media moving through the conduit is determined from inertia force portion of the force between the first and second sections of the conduit obtained by substracting pressure drop portion of the force determined from differential pressure measured by said means for measuring differential pressure from total value of the force measured by said means for measuring force.

3. The combination as set forth in claim 1 wherein said resilient midsection of the conduit comprises a curved section of the conduit.

4. The combination as set forth in claim 1 wherein said resilient midsection of the conduit comprises a flexible section of the conduit.

* * * * *